United States Patent
Guerin

(10) Patent No.: US 10,471,599 B1
(45) Date of Patent: Nov. 12, 2019

(54) ROBOTIC ITEM MANIPULATION USING MAGNETIC COUPLING

(71) Applicant: Amazon Technologies, Inc., Seattle, WA (US)

(72) Inventor: David William Guerin, Boylston, MA (US)

(73) Assignee: Amazon Technologies, Inc., Seattle, WA (US)

( * ) Notice: Subject to any disclaimer, the term of this patent is extended or adjusted under 35 U.S.C. 154(b) by 128 days.

(21) Appl. No.: 15/695,902

(22) Filed: Sep. 5, 2017

(51) Int. Cl.
| | |
|---|---|
| B25J 19/06 | (2006.01) |
| B25J 9/16 | (2006.01) |
| B25J 15/06 | (2006.01) |
| B25J 19/02 | (2006.01) |
| B25J 9/00 | (2006.01) |

(52) U.S. Cl.
CPC ........... *B25J 9/1679* (2013.01); *B25J 9/0084* (2013.01); *B25J 9/0093* (2013.01); *B25J 15/0608* (2013.01); *B25J 19/02* (2013.01)

(58) Field of Classification Search
USPC .................................................. 700/245–264
See application file for complete search history.

(56) References Cited

U.S. PATENT DOCUMENTS

| | | | | |
|---|---|---|---|---|
| 9,785,911 | B2 * | 10/2017 | Galluzzo | B25J 5/007 |
| 2008/0192104 | A1 * | 8/2008 | Nye | B41J 3/4073 |
| | | | | 347/110 |
| 2012/0277911 | A1 * | 11/2012 | Jacobsen | B25J 5/007 |
| | | | | 700/258 |
| 2014/0163664 | A1 * | 6/2014 | Goldsmith | A61B 17/00491 |
| | | | | 623/1.11 |
| 2018/0036889 | A1 * | 2/2018 | Birkmeyer | A47L 15/4293 |
| 2018/0056524 | A1 * | 3/2018 | Birkmeyer | B25J 15/0608 |

\* cited by examiner

*Primary Examiner* — Jonathan L Sample
(74) *Attorney, Agent, or Firm* — Kilpatrick Townsend & Stockton LLP

(57) ABSTRACT

Systems and methods for determining item manipulation strategies using magnetic manipulation are described herein. For example, item information describing properties of an item may be accessed. The item information may indicate that the item includes a magnetic patch. Using this item information, a manipulation strategy for manipulating the item may be determined. The manipulation strategy may include a strategy for manipulating the item using one or more end effectors of a robotic manipulator. The manipulation strategy may be provided to the robotic manipulator for manipulation of the item by magnetically coupling an end effector of the one or more end effectors with the magnetic patch connected to the item.

20 Claims, 8 Drawing Sheets

ROBOTIC ITEM MANIPULATION USING MAGNETIC COUPLING

BACKGROUND

Many modern day industries are beginning to rely more and more on robotic manipulators such as robotic arms. Such robotic manipulators may function to increase repeatability of tasks, increase efficiency of production lines, and bring other benefits to their operators. These benefits may be especially realized when the robotic manipulators perform tasks under the same conditions. For example, a robotic manipulator may include an end effector that is specialized to grasp a particular class of objects. If different objects (e.g., those having different dimensions, surface properties, and other differences) are encountered, however, the robotic manipulator may be unable to achieve a grasp. Because of this, other systems that rely on the object being manipulated may be impacted and the benefits of the robotic manipulator may be minimized.

BRIEF DESCRIPTION OF THE DRAWINGS

Various examples in accordance with the present disclosure will be described with reference to the drawings, in which.

DETAILED DESCRIPTION

Figure 1:
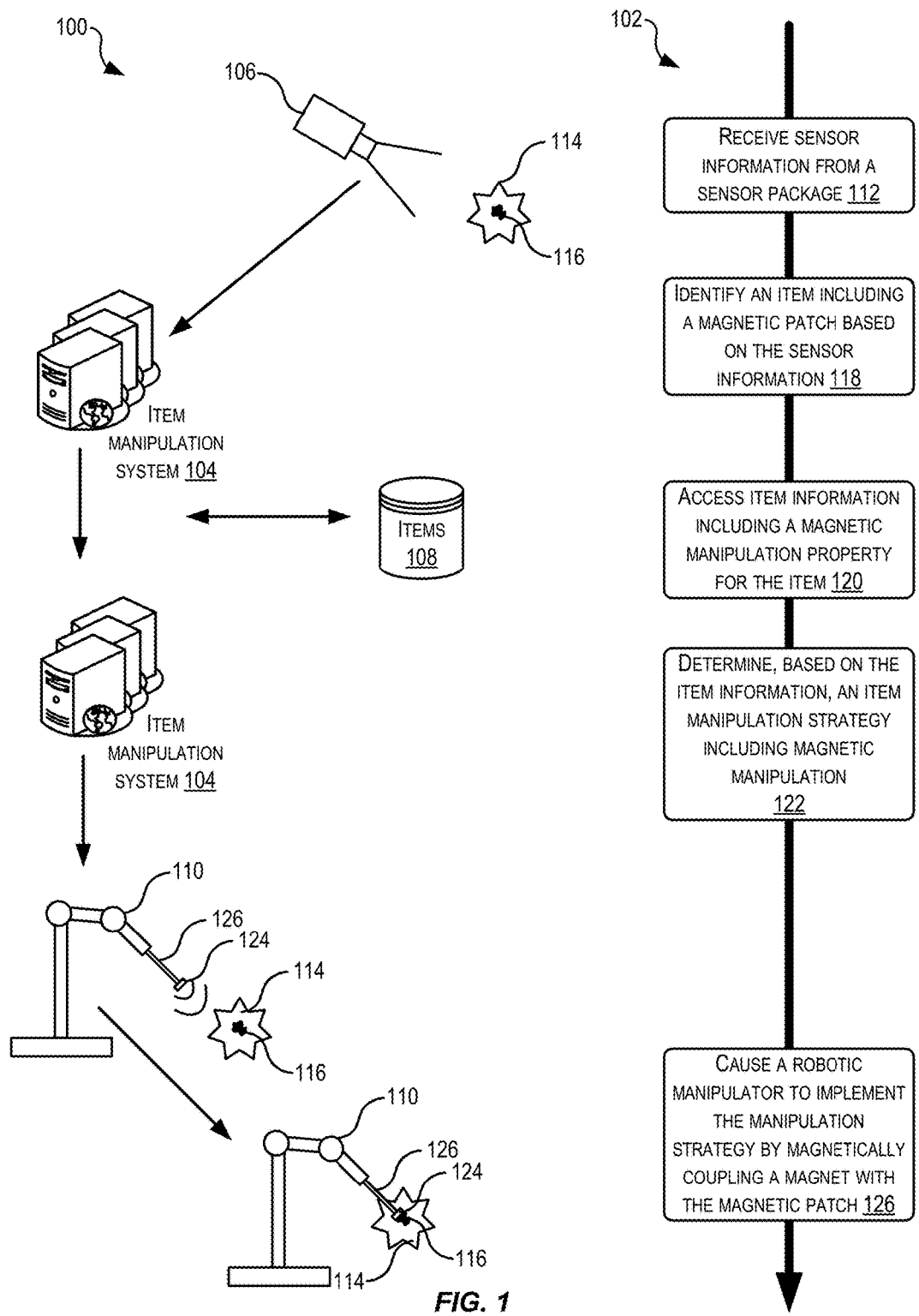
FIG. 1 illustrates an example block diagram and corresponding flow diagram for robotic manipulation of items using magnetic coupling, according to at least one example.

In the following description, various examples will be described. For purposes of explanation, specific configurations and details are set forth in order to provide a thorough understanding of the examples. However, it will also be apparent to one skilled in the art that the examples may be practiced without the specific details. Furthermore, well-known features may be omitted or simplified in order not to obscure the example being described.

Examples herein are directed to, among other things, systems and techniques relating to robotic manipulation of items using magnetic coupling. Robotic manipulators such as robotic arms include end effectors (e.g., end of arm tools) that can be used to manipulate (e.g., pick up, move, drop, slide, etc.) items. For example, material handling systems at material handling facilities may include many robotic manipulators that interact with each other and other automated systems to store, retrieve, and/or otherwise manipulate items.

One success metric relating to item manipulation in such systems is eligibility, e.g., a percentage of items in a system that can be manipulated by a robotic manipulator. A second success metric relating to item manipulation in such systems is reliability, e.g., a rate of success for manipulating eligible items. Some material handling systems process diverse item sets having varied properties, e.g., dimensions, shapes, weights, surface properties, and other properties of the items that may be different. In these systems, achieving high eligibility and high reliability may prove difficult using conventional techniques. For example, even though these systems may employ mechanical pinching end effectors that utilize gripper fingers and vacuum end effectors that utilize vacuum suction to grasp items, there still may be ineligible items based on properties of these items. The systems and techniques described herein may improve eligibility and reliability in such systems with diverse item sets. For example, applying a magnetic patch to certain items may enable an end effector including an electromagnet to later securely manipulate these items (e.g., by magnetically coupling the electromagnet to the magnetic patch). Application of the magnetic patch to items can be selective such that only those items that would benefit from magnetic manipulation will receive the magnetic patch. In some examples, all items may receive magnetic patches. In both cases, the magnetic manipulation becomes another potential approach for manipulation, together with mechanical manipulation, vacuum manipulation, and other manipulation approaches described herein.

Turning now to a particular example, in this example, certain items in an automated material handling facility are flagged as potentially benefiting from magnetic robotic manipulation. These items may be those that are historically difficult to manipulate with mechanical, vacuum, or other types of end effectors. Magnetic patches such as small amounts of magnetic paint (e.g., paint that includes small particles of iron or other magnetic receptive material suspended therein), magnetic stickers (e.g., a magnetic side including a magnetic material and an adhesive side including an adhesive surface), and/or pieces of ferrous material (e.g., ferrous metals) are applied to these items. Item records for these items are updated to reflect the application of the magnetic patches. Information from the item records is then used to determine manipulation strategies for a robotic arm to pick up and move these items as. Such movement can be part of other processes in the material handling facility (e.g., picking, stowing, packing, sorting, etc.). Because the items include the magnetic patches, the manipulation strategies can include manipulation by a magnetized end effector of the robotic arm. Upon execution of a manipulation strategy based on this information, the robotic arm will cause the magnetized end effector to magnetically couple with a magnetic patch previously applied to the item. Such magnetic coupling may be used on its own to the manipulate the item, or may be combined with other approaches used by other end effectors. At least in this way, high values for eligibility and reliability relating to manipulation of diverse item sets can be achieved.

Turning now to the figures, FIG. 1 illustrates a simplified block diagram 100 depicting an example process 102 for robotic manipulation of items using magnetic coupling, according to at least one example. The diagram 100 depicts example states that correspond to the blocks in the process 102. The process 102 describes a process for identifying an item having a magnetic patch and manipulating the item by a magnetized end effector using the magnetic patch.

The diagram 100 includes an item manipulation system 104 that performs at least a portion of the process 102. The item manipulation system 104, as described herein, can include any suitable combination of local and/or networked computing devices configured to communicate with at least a sensor package 106, an item database 108, and and/or one or more robotic manipulator(s) 110. Such communication can take place over one or more networks as described with reference to FIG. 2. In some examples, the item manipulation system 104 is also configured to generate instructions for execution by the robotic manipulator 110. These instructions may be included in a manipulation strategy for achieving a manipulation task. The manipulation strategy may include, for example, a type or type(s) of end effector(s), trajectories, beginning poses, intermediate poses, ending poses, speeds, and other suitable information for performing a manipulation task. Manipulation tasks may include any suitable task performable by the robotic manipulator 110 such as, for example, picking up an item, dropping an item, moving an item, sorting a set of items, sliding an item, etc.

The process 102 may begin at 112 by receiving sensor information from the sensor package 106. The sensor information may be depict or otherwise identify an item 114 and, in some examples, a magnetic patch 116. In some examples, the sensor information may identify a position and/or orientation of the item 114 with respect to some frame of reference. In some examples, the sensor information can be used to identify the item 114 (e.g., image data) and/or may by itself identify the item 114 (e.g., radio-frequency identification (RFID) response signal).

The sensor package 106 can include one or more suitable sensors for item tracking and/or item detection (e.g., optical sensor, RFID reader and antenna, quantum dot sensor, position sensor, Light Detection and Ranging (LIDAR), Radio Detection and Ranging (RADAR), haptic, laser scanner, etc.) in any of their various forms. The sensor information therefore corresponds to the type(s) of sensors selected for the sensor package 106. In some examples, the sensor information includes sensor information from two or more sensors that make up the sensor package 106. For example, first sensor information can be RFID sensor information that indicates the presence of an RFID tag previously associated with the item 114 and second sensor information can be image sensor data that identifies the item 114 and an area surrounding the item 114. In some examples, the sensor package 106 is used as part of a global vision system that collects sensor information apart from the robotic manipulators 110 (e.g., mounted at location(s) separate from the robotic manipulators 110). In some examples, the sensor package 106 is used as part of a local vision system for the robotic manipulators 110 (e.g., mounted or otherwise connected to the robotic manipulators 110).

Generally, the sensor information can be used for detecting the presence of the item 114, the condition of the item 114, the position and/or orientation of the item 114 with respect to some frame of reference (e.g., a conveyor belt, pallet, or item holding tote), and/or for any other suitable purpose.

The item 114 may include the magnetic patch 116 connected thereto. The item 114 can be any suitable item capable of processing in a material handling facility including, for example, personal electronic devices, computers, recreational equipment, food products, television sets, clothing, household supplies, automotive parts, appliances, books, and any other suitable object capable of being processed. The item 114 may also include product packaging used to contain the item 114 and/or shipping containers (e.g., bubble mailers, cardboard boxes, envelopes, etc.) used to contain the items.

At 118, the process 102 may include identifying an item (e.g., the item 114) including a magnetic patch (e.g., the magnetic patch 116) based on the sensor information. The item manipulation system 104 may identify the item. This may include processing the item information until it can be determined beyond some confidence threshold an identity of the item 114. In some examples, identifying the item 114 can include comparing information about possible items with the sensor information until a match is identified. In some examples, identifying the item 114 is based on an expected item order. For example, as items are loaded on to a moving conveyor belt, sensor information can be used to record the order of the items. In this example, identifying the item 114 may simply include determining where the item 114 is disposed in the order of items.

At 120, the process 102 may include accessing item information including a magnetic manipulation property for the item 114. The item manipulation system 104 may access the item information. Accessing the item information may include accessing the item database 108 to retrieve item information associated with the item 114. In some examples, the item database 108 may include characteristics or properties of the items 114. The item database 108 may be organized according to unique item identifiers such as serial numbers assigned by a material handling facility, serial numbers assigned by a manufacturer, RFID tag numbers, and any other unique identifier. The characteristics or properties included in the item database may include, for example, capable of magnetic manipulation, weight, surface type, dimensions, volume, item type, special considerations (e.g., fragile, toxic, flammable, etc.), whether reserved for an order, expected time for storage, stock item images, other item images (e.g., captured at different points in time while the item is being stored), and any other suitable information.

The magnetic manipulation property may indicate whether the item 114 is capable of magnetic manipulation and/or a suitable candidate for such manipulation. In some examples, the magnetic manipulation property indicates whether or not the item 114 includes the magnetic patch 116, whether or not the item 114 is magnetically manipulatable on its own without the magnetic patch 16 (e.g., when the item 114 includes ferrous material), characteristics of the magnetic patch 116 (e.g., size, shape, color, whether it has other forms of identification such as RFID tags, machine-readable identifiers, human-readable identifiers, etc.), and/or characteristics of the application of the magnetic patch 116 on the item 114 (e.g., position and orientation of the magnetic patch 116, which side or surface of the item 114, etc.).

At 122, the process 102 may include determining, based on the item information, an item manipulation strategy including magnetic manipulation. The item manipulation system 104 may determine the item manipulation strategy. In some examples, because at 120 it was determined that the item 114 includes the magnetic patch 116, the item manipulation strategy may include magnetic manipulation. Magnetic manipulation may include manipulation of the item 114 using a magnet 124 that can be selectively coupled to the magnetic patch 116. For example, the robotic manipulator 110 may include an end effector 126 to which is connected the magnet 124 (e.g., via a rod). The magnet 124 may be an elementary magnet or an electromagnet. In some examples, the magnet 124 may be included in conventional end effectors. For example, one or more magnets 124 may be installed in the fingers and/or palm of a mechanical gripper end effector, or one or more magnets 124 may be installed at a distal end of a suction end effector (e.g., an interior portion that includes suction and an exterior portion that is magnetized).

At 128, the process 102 may include causing a robotic manipulator (e.g., the robotic manipulator 110) to implement the manipulation strategy by magnetically coupling a magnet (e.g., the magnet 124) with the magnetic patch 116. In some examples, the robotic manipulator 110 positions the magnet 124 adjacent the magnetic patch 116 such that magnetic forces cause a magnetic coupling between the magnet 124 and the magnetic patch 116. In the case of an electromagnet, a voltage may be applied to "turn on" and "turn off" the electromagnet so as to magnetically couple with the magnetic patch 116 and decouple from the magnetic patch 116.

Figure 2:
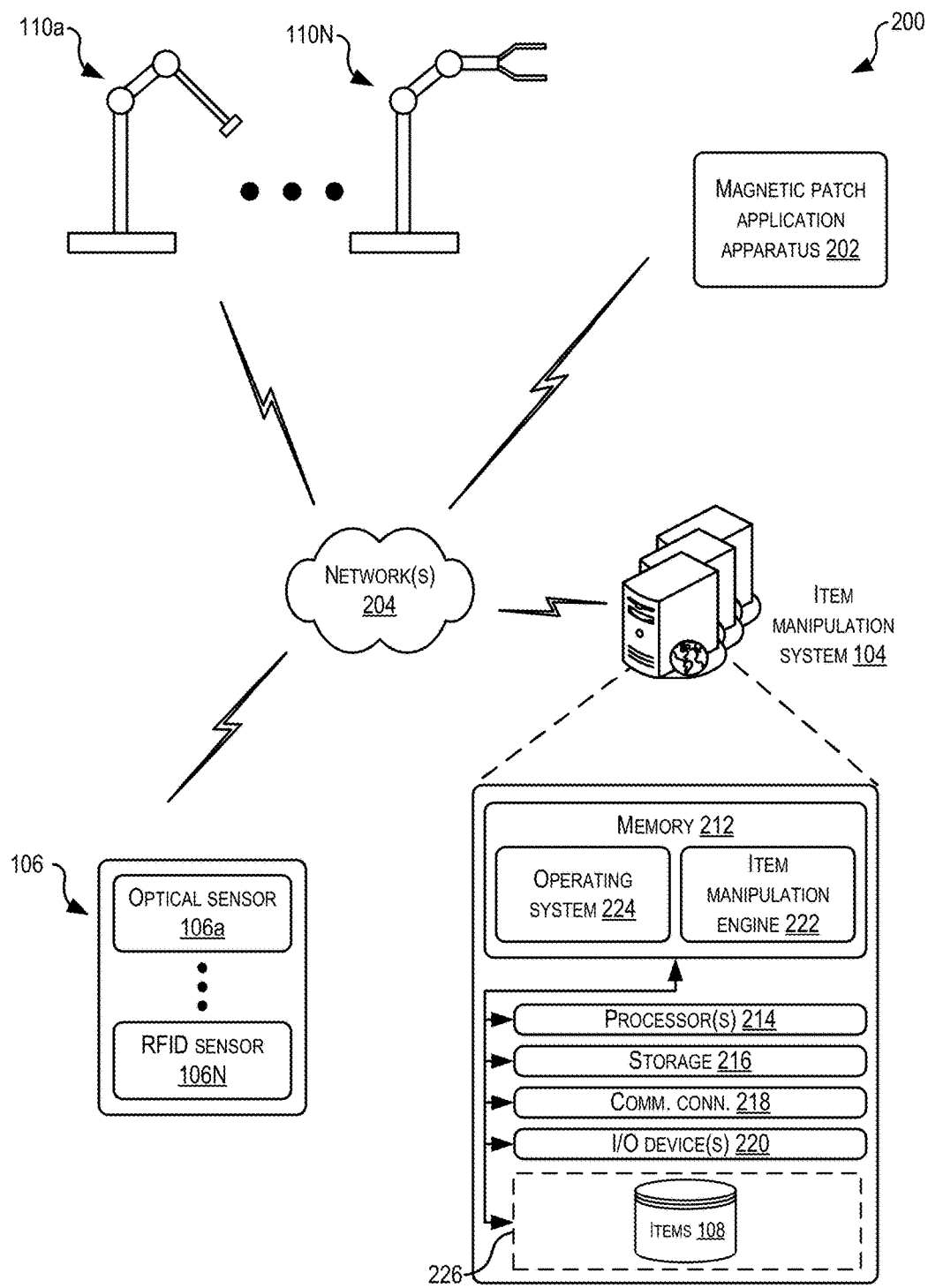
FIG. 2 illustrates an example schematic architecture and devices relating to robotic manipulation of items using magnetic coupling, according to at least one example.

FIG. 2 illustrates an example schematic architecture or system 200 relating to robotic manipulation of items using magnetic coupling, according to at least one example. The architecture 200 includes the sensor package 106, robotic manipulators 110a-110N, a magnetic patch application apparatus 202, and the item manipulation system 104 in communication with each other via one or more network(s) 204.

The network 204 may include any one or a combination of many different types of networks, such as cable networks, the Internet, wireless networks, cellular networks, satellite networks, other private and/or public networks, or any combination thereof. In some examples, certain ones of the elements of the architecture 200 communicate via a first network, while other elements communicate via a second network. The network 204 may also include wireless personal area networks such as Bluetooth, Wi-Fi, and other similar wireless networks. In some examples, the elements of the architecture 200 are electrically coupled to each other instead of, or in addition to, the network 204. For example, the sensor package 106 may share a hardwired connection with the item manipulation system 104.

The sensor package 106, as described with reference to FIG. 1, may include any suitable sensor 106a-106N or combination of sensors usable to detect position of items, presence of items, characteristics of items, and the like. For example, the sensor package 106 may include optical sensors 106a and an RFID sensor or other non-optical sensor 106N. In some examples, the sensor package 106 may be usable to gather data in one dimension, in two dimensions, or in three dimensions.

The robotic manipulators 110a-110N may be any suitable material handling equipment (e.g., Cartesian robot, cylindrical robot, spherical robot, articulated robot, parallel robot, SCARA robot, anthropomorphic robot, any other suitable robotic manipulator and/or robotic arm, automated guided vehicles including lift capabilities, vertical lift modules, and any other suitable material handling equipment that interacts with or otherwise handles objects). In some examples, the robotic manipulators 110a-110N are the same type of material handling equipment, but differ with respect to end effector. For example, the robotic manipulator 110a may include a magnetized end effector, and the robotic manipulator 110N may include a mechanical pinching end effector. In some examples, different combinations of end effectors may be used on any one robotic manipulator 110 (e.g., more than one end effector).

Each robotic manipulator 110 may include any suitable type and number of sensors disposed throughout the robotic manipulator 110 (e.g., sensors in the base, in the arm, in joints in the arm, in an end effector, or in any other suitable location). The sensor package 106 includes examples of such sensors. The sensors can include sensors configured to detect pressure, force, weight, light, items and other objects, slippage, and any other information that may be used to control and/or monitor the operation of the robotic manipulator 110, including the end effector. The sensors may be in communication with a management device (e.g., a local computer) that is local to the robotic manipulator and/or may be in direct communication with the item manipulation system 104. In this manner, the management device may control the operation of the robotic manipulator 110 and the end effector based at least in part on sensing information received from the sensors. The sensors may include any suitable combination of sensors capable of detecting depth of objects, capturing RGB and other images of objects, scanning machine-readable information, capturing thermal images, detecting position and orientation of objects, and performing any other suitable sensing as described herein.

In some examples, depending on the application for the robotic manipulator 110, different end effectors (e.g., end of arm tools) may be selected. Information about the end effectors available may be organized in terms of grasping function (e.g., in a database). A grasping function may define functionally how an end effector is capable of manipulating an object. The grasping function may differ between end effectors with respect to capacities, categories, and physical limitations. Example categories of end effectors include: magnetized end effectors, soft robotic end effectors, vacuum end effectors, electro-adhesion end effectors, and mechanical or electromechanical end effectors. Soft robotic end effectors may generally include flexible structures that may be manipulated between various orientations. The structures may include silicon bodies or other flexible material. Manipulation of the flexible material may be achieved through use of flexible actuators such as air muscles (e.g., contractile or extensional devices operated by pressurized air movement relative to filling or emptying a pneumatic bladder), electro-active polymers (e.g., polymers which change size or shape when stimulated by an electric field), or Ferrofluids (e.g., fluids having suspended Ferro-magnetic particles capable of altering a size or shape of the fluid volume when subjected to a magnetic field). Vacuum end effectors may grasp objects using suction. Electro-adhesion end effectors can include an array of electrodes arranged along a flexible or rigid substrate capable of applying a charge (akin to static electricity) that can adhere an object to the substrate portions that are in contact with the object. Mechanical or electromechanical end effectors may include pinchers, claws, grippers, or other rigid components that may be actuated relative to one another for grasping an object. Other end effectors may also be utilized to facilitate additional grasping functions.

The magnetic patch application apparatus 202 may be any suitable apparatus capable of applying magnetic patches to items. For example, the magnetic patch application apparatus 202 may include a paint spray nozzle, a paint reservoir for holding magnetic paint, and a pump to automatically apply paint splotches to the items. In some examples, a robotic arm is used to position the spray nozzle with respect to the items. In some examples, the paint spray nozzle may be coupled with a stencil in order to paint unique shapes. In some examples, the paint spray nozzle applies a generic "spray" of magnetic paint that constitutes the magnetic patch. The paint may be applied directly to an exterior surface of the item or item packaging. In some examples, the surface area and thickness of the paint splotch may depend at least in part on a density of the magnetic material in the paint (e.g., iron or other metallic material), a weight of the item to be manipulated, and a field strength of the magnet that will be used. Thus, when the weight is higher or the field strength is lower, a greater surface area of paint may be applied. In some examples, the item manipulation system 104 and/or the magnetic patch application apparatus 202 may determine characteristics of the magnetic patch prior to the magnetic patch application apparatus 202 applying the magnetic patch. Thus, the splotch may be specific to each of the various items encountered by the magnetic patch application apparatus 202. In some examples, the magnetic patch application apparatus 202 applies the same or a similar magnetic patch to a group of items (e.g., as a series of bursts or a stream of paint that the items are passed through). For example, the magnetic patch application apparatus 202 may include a waterfall of paint that at least a portion of the items are passed through.

As the magnetic patch may also be a magnetic sticker or magnetic tape, the magnetic patch application apparatus 202 may also include an apparatus for placing magnetic stickers on items. For example, a robotic arm may be used to place the stickers on the items. In some examples, the stickers are rolled, blown, or otherwise transferred to the items using conventional techniques for sticker application. In some examples, the item manipulation system 104 and/or the magnetic patch application apparatus 202 may determine characteristics of the magnetic patch prior to the magnetic patch application apparatus 202 applying the magnetic patch. For example, the magnetic patch application apparatus 202 may select an appropriate magnetic sticker from a set of stickers having different characteristics based on the item to receive the magnetic sticker. In this manner, heavier items may receive a larger sticker (or more than one sticker), and lighter items may receive a smaller sticker (or part of a standard sticker).

As the magnetic patch may also be a piece of ferrous material, the magnetic patch application apparatus 202 may also include an apparatus for connecting or otherwise associating one or more pieces of ferrous material on items. For example, the ferrous material may be a piece of iron or iron alloy of any suitable shape and size that is adhered to the item, formed into the item, or otherwise connected to the item.

The item manipulation system 104 may be configured to manage the operation of the other elements of the architecture 200. To this end, the item manipulation system 104 may include any suitable combination of one or more computing devices such as, but not limited to, a server, a virtual machine instance, a set of servers or set of virtual machines, a mobile phone, a smartphone, a PDA, a laptop computer, a desktop computer, a thin-client device, a tablet computer, etc. The item manipulation system 104 may synchronize operation of the magnetic patch application apparatus 202, the sensor packages 106, and the robotic manipulators 110. The item manipulation system 104 may also generate instructions for the robotic manipulators 110 to control operations of robotic manipulators. These instructions can be provided to the robotic manipulators 110 in any suitable manner.

Turning now to the item manipulation system 104 in detail, in some examples, the item manipulation system 104 may include at least one memory 212 and one or more processing units (or processor(s)) 214. The processor(s) 214 may be implemented as appropriate in hardware, computer-executable instructions, firmware, or combinations thereof. Computer-executable instruction or firmware implementations of the processor(s) 214 may include computer-executable or machine-executable instructions written in any suitable programming language to perform the various functions described.

The memory 212 may store program instructions that are loadable and executable on the processor(s) 214, as well as data generated during the execution of these programs. Depending on the configuration and type of the item manipulation system 104, the memory 212 may be volatile (such as RAM) and/or non-volatile (such as ROM, flash memory, etc.). The item manipulation system 104 may also include additional removable storage and/or non-removable storage 216 including, but not limited to, magnetic storage, optical disks, and/or tape storage. The disk drives and their associated non-transitory computer-readable media may provide non-volatile storage of computer-readable instructions, data structures, program modules, and other data for the computing devices. In some implementations, the memory 212 may include multiple different types of memory, such as SRAM, DRAM, or ROM. While the volatile memory described herein may be referred to as RAM, any volatile memory that would not maintain data stored therein once unplugged from a host and/or power would be appropriate. The memory 212 and the additional storage 216, both removable and non-removable, are both additional examples of non-transitory computer-readable storage media.

The item manipulation system 104 may also contain communications connection(s) 218 that allow the item manipulation system 104 to communicate with a data store, another computing device or server, user terminals and/or other devices via the networks 208. In this manner, the communications connections 218 can include network interfaces to enable connection to network devices. The item manipulation system 104 may also include I/O device(s) 220, such as a keyboard, a mouse, a pen, a voice input device, a touch input device, a display, speakers, a printer, etc.

Turning to the contents of the memory 212 in more detail, the memory 212 may include an operating system 224 and/or one or more application programs or services for implementing the features disclosed herein including an item manipulation engine 222. In some examples, the item manipulation engine 222 may be configured to implement the techniques described herein.

The item manipulation system 104 may also include a data store 226. In some examples, the data store 226 may include one or more data stores, databases, data structures, or the like for storing and/or retaining information associated with the item manipulation system 104. For example, the data store 226 may include databases, such as the item database 108 discussed previously.

Figure 3:
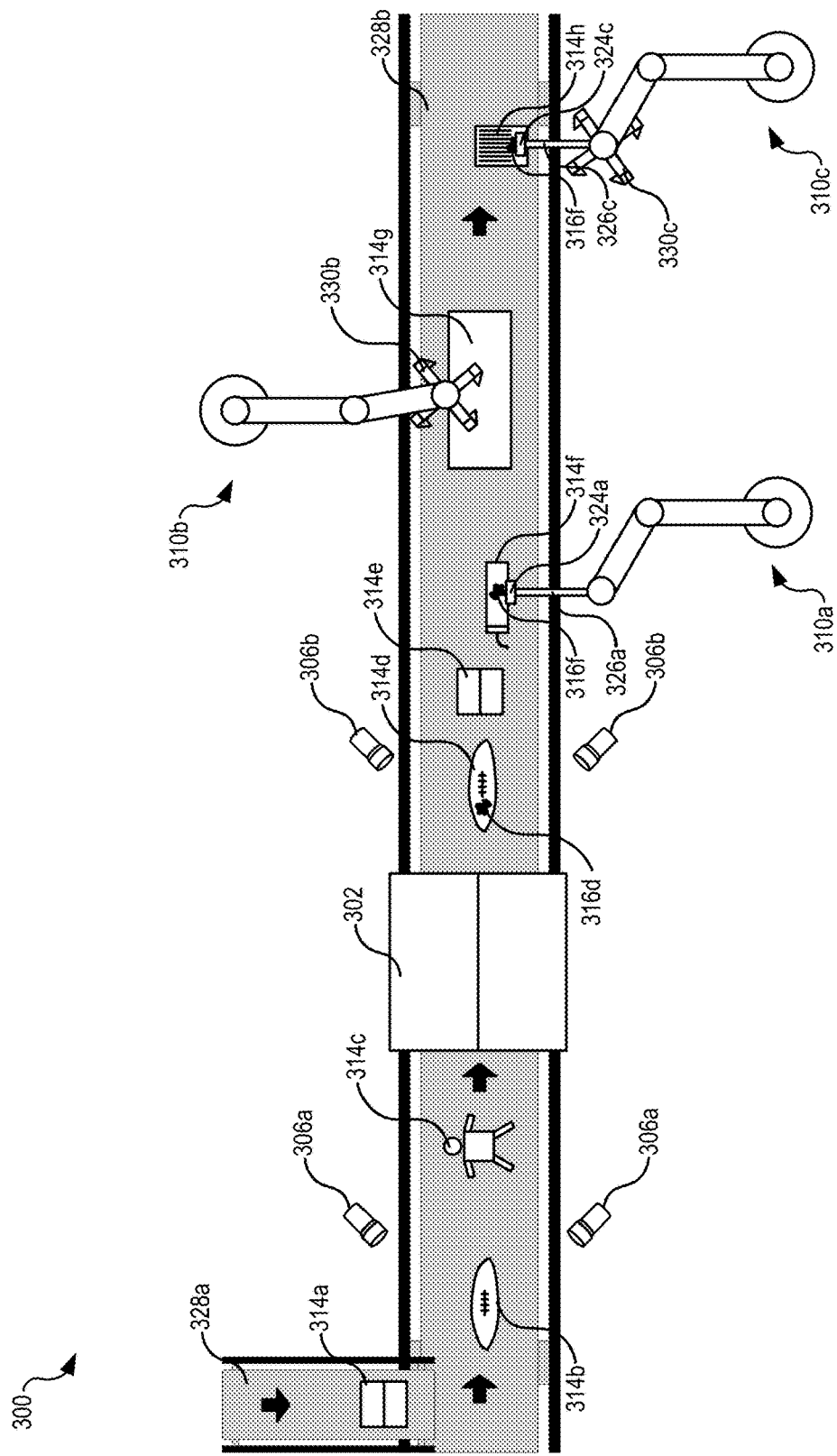
FIG. 3 illustrates an example environment in which techniques relating to robotic manipulation of items using magnetic coupling may be implemented, according to at least one example.

FIG. 3 illustrates an example environment 300 in which techniques relating to robotic manipulation of items using magnetic coupling may be implemented, according to at least one example. In particular, elements of the environment 300 can be used to implement a process depicted with respect to FIG. 4 as process 400. Thus, FIGS. 3 and 4 will be described with reference to each other. Beginning first with FIG. 3, the environment 300 includes a first conveyance device 328a that delivers the items 314 to a second conveyance device 328b. The items 314 are examples of the items 114. The conveyance devices 328 are examples of conveyor belts, moving surfaces, overhead cranes, or other material handling equipment that are capable of moving the items 314. The items 314, as illustrated, may include a diverse set of items.

The conveyance devices 328 are shown as examples, but other conveyance devices 328 arranged differently may also be used. Similarly, while the elements of the environment 300 are disposed about a single conveyance device (e.g., the second conveyance device 328b) and the process 400 will be described as being performed on the items 314 while they are traveling along the second conveyance device 328b, it should be understood that the elements may be spread to different regions in a material handling facility, whether or not adjacent to a conveyance device.

While the environment 300 includes the robotic manipulators 310 manipulating the items 314 with respect to the second conveyance device 328b, the techniques described herein also include using the robotic manipulators 310 to manipulate items that are held or otherwise contained in item containers and/or inventory holders.

The item containers, in some examples, may include rectangular boxes having a base connected to four walls. The item containers may be configured to retain sets of similar items (e.g., books) and/or sets of dissimilar items (e.g., books, cooking utensils, DVD's, footballs, etc.). In this example, manipulating the items 314 may include picking items from the item containers, placing items into item containers, transferring items between item containers, singulating items within item containers, picking item containers including items, placing item containers including items, and performing other similar manipulations with respect to items. In some examples, the item containers may include magnetic patches or otherwise be formed, in part, from ferrous materials. In this manner, the item containers may be also be magnetically manipulatable. The item containers may be adapted for transportation using robotic drive units. For example, a frame may be configured to hold a plurality of item containers, and a robotic drive unit may detachably couple with the frame to move the plurality of item containers.

The inventory holders, in some examples, may include a shelving unit configured to retain sets of similar items and/or sets of dissimilar items. In this example, manipulating the items 314 may include picking items from inventory holders, placing items into inventory holders, transferring items between inventory holders, singulating items within inventory holders, and performing other similar manipulations with respect to items. In this some examples, the shelving units may be fixed and/or mobile. In a mobile example, a robotic drive unit may be configured to detachably couple with a shelving unit to move the shelving unit from a first location to a second location (e.g., from a storage area to a robotic manipulator) for manipulation of the items stored therein.

The environment 300 also includes a magnetic patch application apparatus 302, a first sensor package 306a, a second sensor package 306b, and a set of robotic manipulators 310a-310c. The magnetic patch application apparatus 302 is an example of the magnetic patch application apparatus 202. Likewise, the sensor packages 306 and the robotic manipulators 310 are respectively examples of the sensor packages 106 and the robotic manipulators 110.

Generally, the items 314 move along the conveyance devices 328 in a direction from the first conveyance device 328a towards the robotic manipulators 310. The sensor packages 306 collect sensor information that may be used to identify the items 314 and generation manipulation strategies. The magnetic patch application apparatus 302 is used to selectively apply magnetic patches 316 to certain ones of the items 314. This may make sense because certain ones of the items 314 may require the magnetic patches 316 in order for one of the robotic manipulators 310 to reliably manipulate the items 314. Oddly shaped items, items with rough surfaces, small items, items with non-uniform surfaces, and other such items may be good candidates for application of the magnetic patches 316. The magnetic patches 316 are examples of the magnetic patches 116.

The items 314 may be in a known or unknown orientation on the conveyance devices 328. Thus, in some examples, determining manipulation strategies for manipulation of the items 314 may include determining the orientations of the items.

The robotic manipulators 310 may be configured to manipulate the items 314 using the magnetic patches 316 or otherwise. For example, the robotic manipulator 310a may include an end effector 326a including a magnet 324a. The end effector 326 is an example of the end effector 126. Likewise the magnet 324 is an example of the magnet 124. As illustrated, the end effector 326a can use the magnet 324a to magnetically couple with the magnetic patch 316f of the item 314f (e.g., a water bottle). The robotic manipulator 310b may include a non-magnetic end effector 330b. While illustrated as a mechanical gripper, the non-magnetic end effector 330b may be any end effector that manipulates items not using magnetism. Thus, the non-magnetic end effector 330b may be used to manipulate the item 314g that is of uniform shape and size and lacks a magnetic patch 316. The robotic manipulator 310c may include two or more end effectors such as the end effector 326c including the magnet 324c and the non-magnetic end effector 330c. The robotic manipulator 310c may use both end effectors 326c, 330c simultaneously and/or separately to manipulate the items 314. As illustrated, the robotic manipulator 310c can use the magnet 324c to magnetically couple with the magnetic patch 316h of the item 314h.

Figure 4:
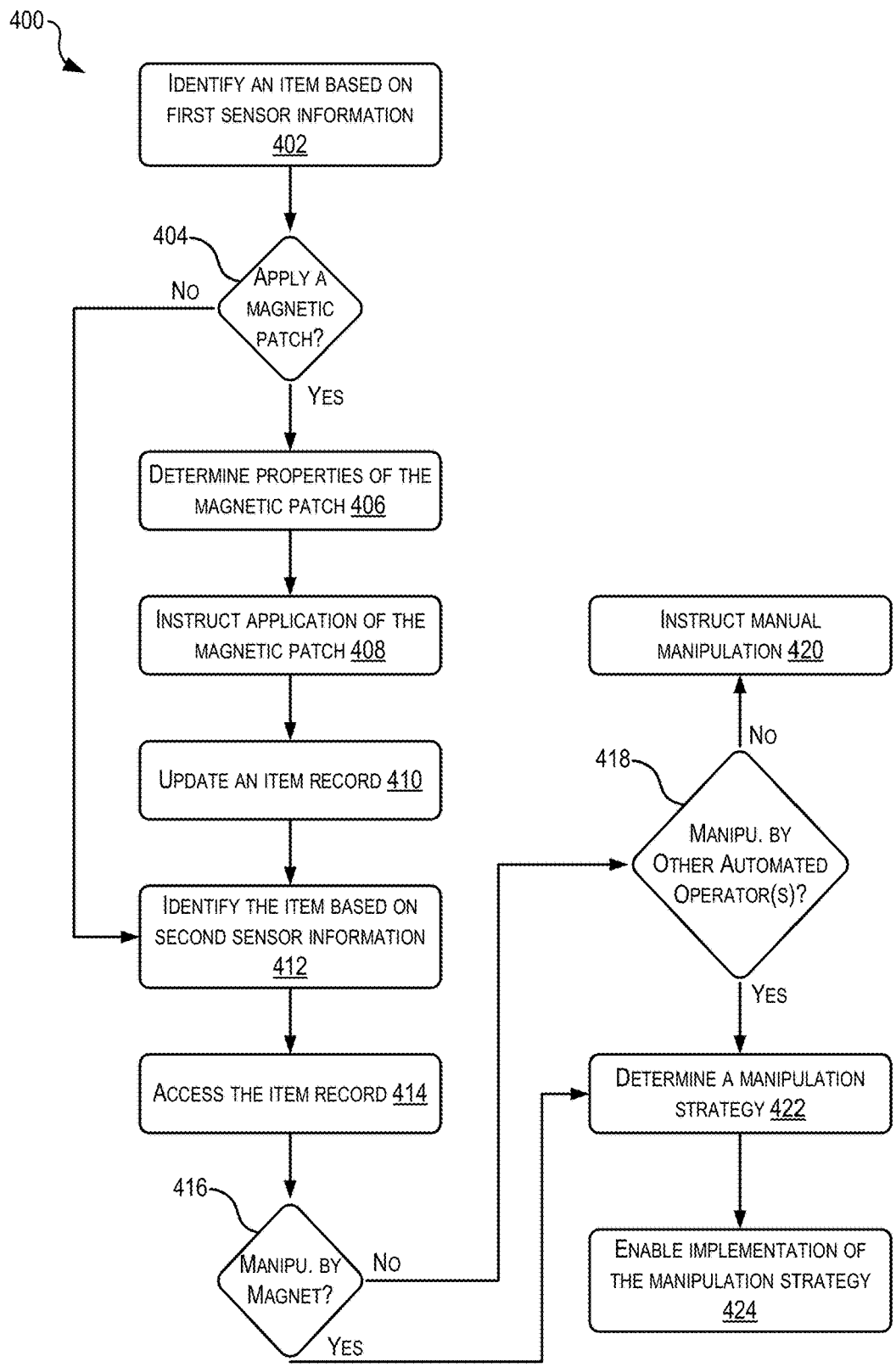
FIG. 4 illustrates an example flow diagram depicting example acts that may be performed in an environment similar to the environment from FIG. 3, according to at least one example.
Figure 6:
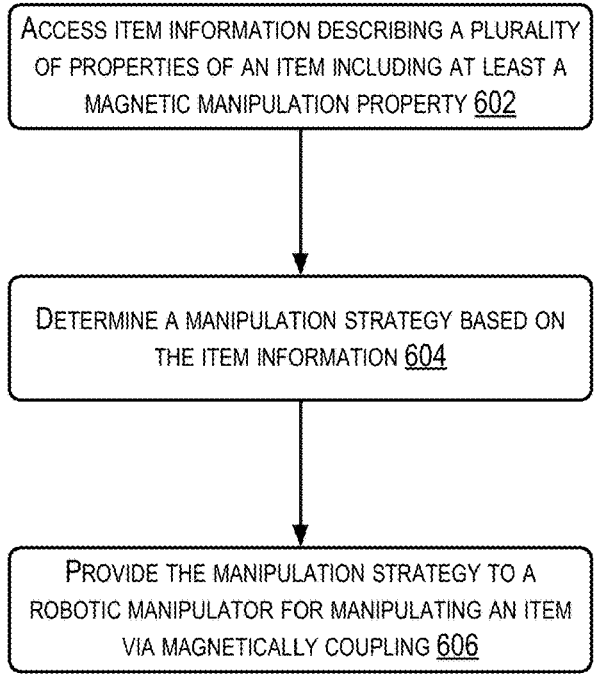
FIG. 6 illustrates an example flow diagram depicting example acts for implementing techniques relating to robotic manipulation of items using magnetic coupling, according to at least one example.
Figure 7:
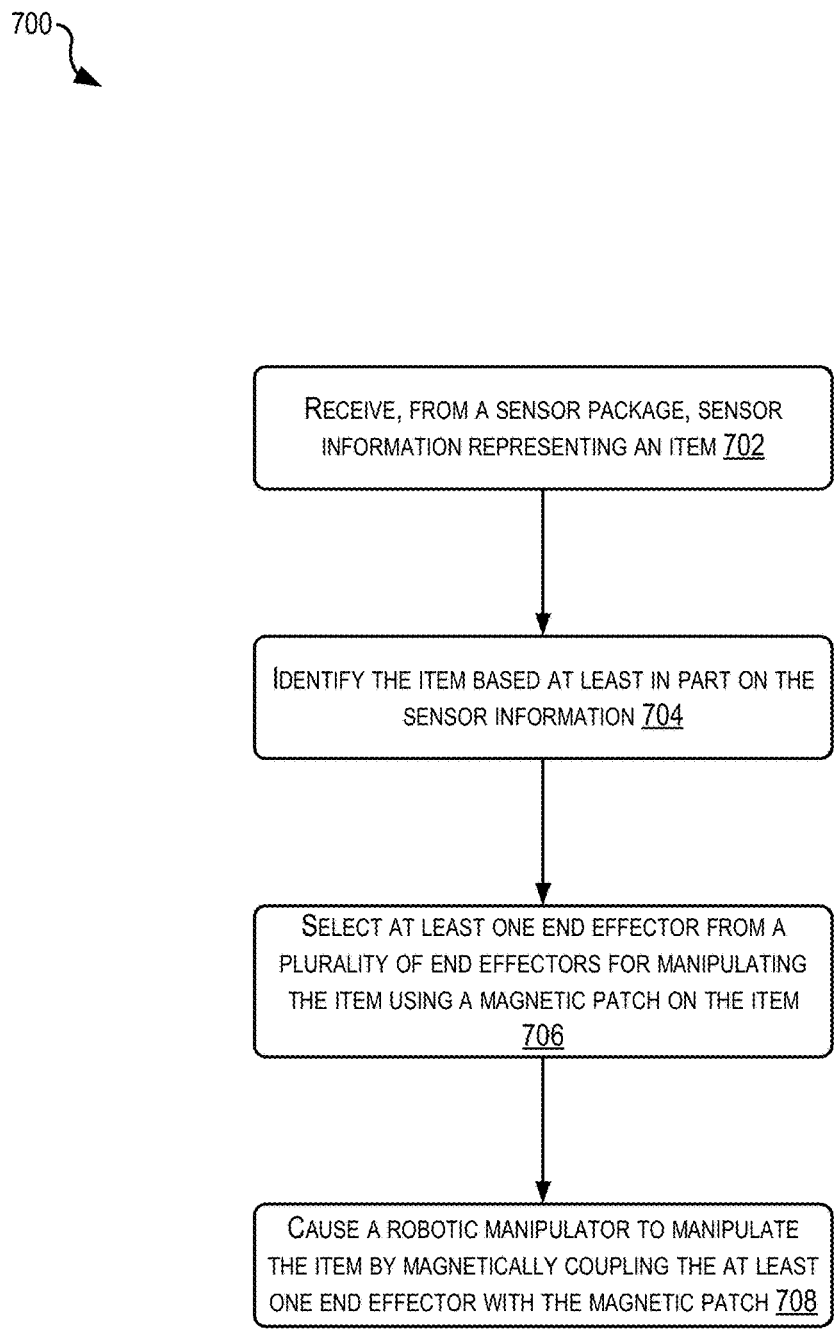
FIG. 7 illustrates an example flow diagram depicting example acts for implementing techniques relating to robotic manipulation of items using magnetic coupling, according to at least one example.

FIGS. 4, 6, and 7 illustrate example flow diagrams showing respective processes 400, 600, and 700 as described herein. These processes 400, 600, and 700 are illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement the processes.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium is non-transitory.

Returning now to FIG. 4, FIG. 4 depicts the process 400 including example acts or techniques relating to robotic manipulation of items using magnetic coupling, according to at least one example. The item manipulation engine 222 (FIG. 2) of the item manipulation system 104 (FIGS. 1 and 2) may perform the process 400 of FIG. 4.

The process 400 may begin at 402 by identifying an item based on first sensor information. In some examples, the sensor information may be collected by the first sensor package 306a. For example, as the items 314 are added to the second conveyance device 328b, the first sensor package 306a, which may include any suitable collection of one or more sensors, may collect the sensor information. In this manner, the item manipulation system 104 may be updated with current item information for what items 314 are currently being processed. As the first sensor package 306a may include optical sensors such as cameras, the sensor information may visually depict the items 314. As the first sensor package 306a may include non-optical sensors such as RFID readers, the sensor information may include response signal information that uniquely identifies the items 314.

In some examples, the first sensor package 306a may be installed in a material handling facility at a location where inbound items are processed. In this manner, the items 314 may be identified early on in a process that includes inbound processing, storage, and outbound processing (e.g., picking, packaging, and shipping). In some examples, instead of or in addition to receiving the sensor information at 402, the item manipulation system 104 may access information that indicates expected items, e.g., in an expected item order.

In some examples, at block 402, the process 400 may also include updating and/or creating item records associated with the items 314. For example, as an item 314 is identified, the process 400 can determine whether an item record previously exists for this item and, if not, may create a new item record. The items records can be stored in the item database 108.

At 404, the process 400 may include determining whether to apply a magnetic patch to the item identified at 402. In some examples, this determination may depend in part on properties of the item. For example, items 314 having rough and/or non-uniform surfaces, asymmetrical shapes, small size relative to other items, and other similar properties may be good candidates for receiving magnetic patches. This set of items 314 may be those that are not easily manipulated by a robotic manipulator using vacuum suction and/or mechanical grippers.

The properties of the items 314 usable to make the determination at 404 may be determined from the sensor information and/or may be determined from the item database 108. For example, once the item has been identified at 402, the item database 108 can be accessed to obtain item information about the item. This item information may include properties such as those described herein including, for example, a magnetic manipulation property. In this example, the determination at 404 may be based on the item information including the magnetic manipulation property. In some examples, the item information may also indicate whether the item already has a magnetic patch. For example, a manufacturer may apply magnetic patches to its products and/or product packaging before they are delivered to the material handling facility. In some examples, the magnetic patches may be applied as part of other processes performed at the material handling facility.

If the answer at 404 is NO, the process 400 proceeds to 412. At 412, the process 400 may include identifying the item based on second sensor information. In some examples, the second sensor information may be received from the second sensor package 306b. Block 412 will be discussed in detail herein. Returning now to 404, if the answer at 404 is YES, the process 400 proceeds to 406. At 406, the process 400 may include determining properties of the magnetic patch 316 to be applied such as dimensions of the magnetic patch 316. This determination may be based at least in part on item information (e.g., surface properties, weight, whether capable of manipulation by other end effectors, and other similar properties), density of metallic material in the magnetic patch 316 (e.g., density of iron in iron-infused paint, density of iron in iron-infused sticker), available surface area on the item 314 for application of the magnetic patch 316, and/or field strength and/or magnetic flux density of the magnets 324 to be used to manipulate the items 314. The field strength, which may be referred to the H-field, may relate to the magnetic field strength or intensity created by the magnets 324. The magnetic flux density, which may be referred to as to the B-field, may relate to magnetic flux density or magnetic field.

At 408, the process 400 may include instructing application of the magnetic patch. In some examples, instructing application may include instructing the magnetic patch application apparatus 302 to apply the magnetic patch 316 based at least in part on the determination at 406 (e.g., properties of the magnetic patch 316).

The magnetic patch application apparatus 302, as described herein, can be situated within a tunnel disposed adjacent to the second conveyance device 328b. In some examples, the first sensor package 306a and the magnetic patch application apparatus 302 are both included in the same or different tunnels. Adjacent an entrance of the tunnel, the first sensor package 306a may be used to collect sensor information such as capturing images of the item. Adjacent an exit of the tunnel, the magnetic patch application apparatus 302 may be used to apply the magnetic patches 316.

As illustrated in FIG. 3, some of the items 314 include magnetic patches 316 and some do not. This may be a product of the determination made at 404. Even though it was determined to not apply magnetic patches to some items such as the item 314e, these items such as the item 314e may nevertheless pass by the magnetic patch application apparatus 302 without receiving a magnetic patch 316. In at least this manner, the magnetic patch application apparatus 302 may selectively apply magnetic patches 316 to the items 314.

At 410, the process 400 may include updating an item record. This may include updating an item record associated with an item that received a magnetic patch. The item record can be stored in the item database 108. This update may represent that the magnetic patch has been applied.

As introduced herein, at 412, the process 400 may include identifying the item based on second sensor information. In some examples, the second sensor information may be received from the second sensor package 306b. In some examples, the second sensor package 306b may be local to one or more of the robotic manipulators 310 (e.g., a local vision system). In other examples, the second sensor package 306b may be separate from the one or more robotic manipulators 310 (e.g., a global vision system). The first sensor information collected by the first sensor package 306a may be used to determine whether to apply magnetic patches and the second sensor information collected by the second sensor package 306b may be used to determine a manipulation strategy as further illustrated by FIG. 4. In some examples, either just the first or just the second sensor information is collected and used for both purposes.

At 414, the process 400 may include accessing the item record. For example, once the item has been identified based on the second sensor information, the item record can be accessed to obtain item information associated with the item. The item record can be stored in the item database 108.

At 416, the process 400 may include determining whether the item is manipulatable by a magnet. This may include determining whether, based on the item record accessed at 414, the item identified at 412 includes a magnetic patch. For example, if the item identified at 412 were the item 314d, the item record accessed at 414 may indicate that the item 314d includes the magnetic patch 316d. Based on this information, at 416, it may be determined that the item 314d is manipulatable by a magnet (e.g., a magnet of a robotic manipulator). In this example, the answer at 416 will be YES. If so, the process 400 proceeds to 422. At 422, the process 400 may include determining a manipulation strategy. The manipulation strategy may be particularized to the item identified at 412. In some examples, manipulation strategies are reused when the same items 314 are presented for manipulation under the same circumstances as earlier items (e.g., same position and/or orientation with respect to the robotic manipulators). In some examples, the manipulation strategy may include instructions for execution by a robotic manipulator including an end effector 326 including a magnet 324 to manipulate the item 314d (e.g., by the magnetic patch 316d).

If the item identified at 412 were the item 314e, the item record accessed at 414 may indicate that the item 314e does not include a magnetic patch 316e. Based on this information, at 416, it may be determined that the item 314e is not manipulatable by a magnet (e.g., a magnet of a robotic manipulator). In this example, the answer at 416 will be NO. If the answer at 416 is NO (the item is not manipulatable by a magnet), the process 400 may proceed to 418. At 418, the process 400 may determine whether the item is manipulatable by other automated operators such as the other end effectors described herein. For example, for the item 314e, the process 400 may determine that although it is not manipulatable by the end effector 326a including the magnet 324a, the item 314e is manipulatable by the end effector 330b and/or the end effector 330c.

If the answer at 418 is NO, the process 400 proceeds to 420. At 420, the process 400 may include instructing manual manipulation of the item. For example, if it is determined that the item is otherwise unmanipulatable by any of the end effectors or other automated operators available in the environment 300, a human operator may be instructed to manipulate the item. Thus, instructing manual manipulation of the item may include providing an instruction in the form of visual information, audible information, and the like for a human operator to perform the manipulation.

If the answer at 418 is YES, the process 400 proceeds to 422 where a manipulation strategy is determined. The manipulation strategy may be determined based at least in part on the determinations made at 416 and/or 418. In this manner, the manipulation strategy may identify which type of end effector is appropriate for manipulating which items. In some examples, the manipulation strategy also identifies other information about manipulating items, as described herein.

At 424, the process 400 enables implementation of the manipulation strategy. In some examples, this may include sending the manipulation strategy to the robotic manipulators 310 and instructing them to execute or otherwise perform the strategy. Thus, the manipulation strategy may be provided as machine-readable instructions that can be executed by the robotic manipulators 310. In some examples, the manipulation strategy includes a list of prioritized approaches for manipulating an item. For example, this may include poses and/or end effectors to try first before trying other poses and/or other end effectors. In some examples, the manipulation strategy may begin with strategies that use non-magnetic end effectors first followed by strategies that use magnetic end effectors.

Returning now to FIG. 3, it will be appreciated that certain ones of the items 314 include the magnetic patches 316 and certain ones do not include the magnetic patches 316 for the reasons described herein. For example, the item 314d, which is a football having an oblong shape with a rough surface, may include the magnetic patch 316d. The item 314e, which is a rectangular packing box having a uniform shape and smooth surface, may not include a magnetic patch. The item 314f, which is a water bottle having cylindrical shape and smooth surface, may include the magnetic patch 316f. The item 314g, which is a large rectangular item having a uniform shape and smooth surface, may not include a magnetic patch. The item 314h, which is a plastic package of writing pens having a non-uniform surface and odd shape, may include the magnetic patch 316h.

Figure 5:
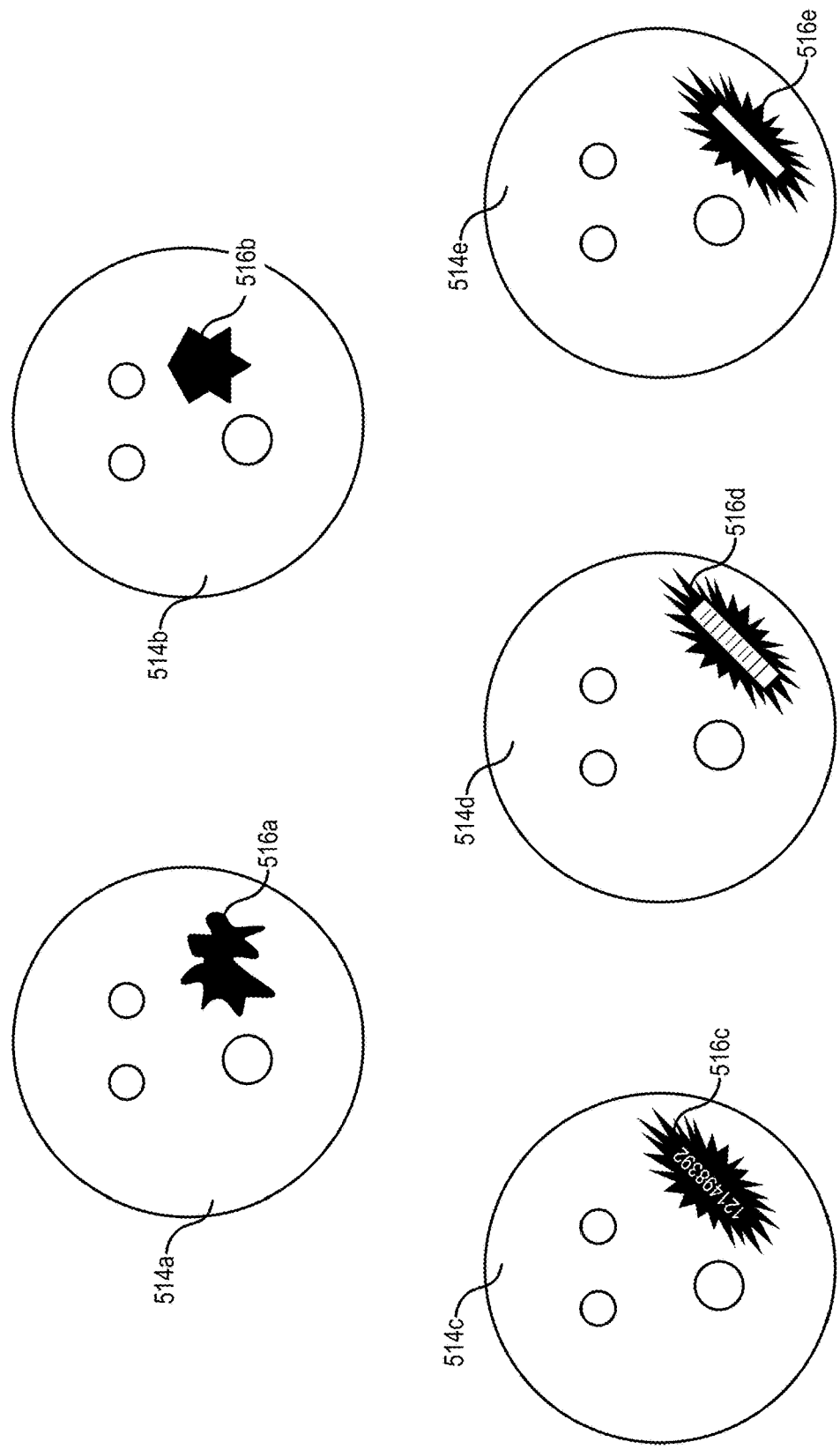
FIG. 5 illustrates example magnetic patches that may be used for robotic manipulation of items using magnetic coupling, according to various examples.

Turning now to FIG. 5, FIG. 5 illustrates example magnetic patches 516a-516e that may be used for robotic manipulation of items using magnetic coupling, according to various examples. The magnetic patches 516 are shown attached to items 514. The magnetic patches 516 and the items 514 are examples of the magnetic patches 116 and the items 114. In FIG. 5, the items 514 are respectively illustrated as bowling balls, which is an example of a type of item that may benefit from such manipulation techniques.

The magnetic patch 516a includes an asymmetrical and non-uniform shape. In some examples, the asymmetrical shape of the magnetic patch 516a may be used to determine an orientation of the item 514a. For example, a first orientation of the item 514a may be recorded when the magnetic patch 516a is applied to the item 514a. In this manner, an association is formed between the first orientation of the item 514a and a first orientation of the magnetic patch 516a. When the item 514a is later encountered, a second orientation of the magnetic patch 516a can be identified and based on the association, a second orientation of the item 514a may be determined. The magnetic patch 516a may be splotch (e.g., a spray, burst, etc.) of magnetic paint, magnetic sticker, or other suitable magnetic material capable of application on the item 514a.

The magnetic patch 516b includes a uniform shape having at least one axis of symmetry. In some examples, the magnetic patch 516b can be used to determine an orientation of the item 514b similarly as described with reference to the magnetic patch 516a. In some examples, the magnetic patch 516b may be uniform because it is a magnetic sticker and/or magnetic paint sprayed on using a stencil. In some examples, the magnetic sticker can be formed in some uniform manner. In some examples, components of the magnetic patch 516b may be selectively added to the magnetic patch 516b. For example, the triangular tips that make up the magnetic patch 516b may be selectively included or excluded in order to provide a magnetic patch with sufficient surface area for manipulation of the item 514b by a magnet.

The magnetic patches 516c-516e include an asymmetrical and non-uniform shape. In some examples, the magnetic patches 516c-516e may be magnetic stickers or magnetic paint. The magnetic patches 516c-516e may also be used to orient the items 514c-514e. In some examples, the magnetic patches 516c-516e may also be used to identify the items 514c-514e.

For example, the magnetic patch 516c may include a human-readable code, illustrated as a series of numbers, that may uniquely identify the item 514c and/or a class of items to which the item 514c belongs. An association may be stored between the number printed or otherwise applied to the magnetic patch 516c and the item 514c (e.g., in the item database 108).

The magnetic patch 516d may include a machine-readable code, illustrated as a two-dimensional barcode, that may uniquely identify the item 514d and/or a class of items to which the item 514d belongs. An association may be stored between the barcode on the magnetic patch 516d and the item 514d (e.g., in the item database 108).

The magnetic patch 516e may include an identifying tag such as an RFID tag that may uniquely identify the item 514e and/or a class of items to which the item 514e belongs. An association may be stored between a number stored on the RFID tag associated with the magnetic patch 516e and the item 514e (e.g., in the item database 108).

FIG. 6 depicts the process 600 including example acts or techniques relating to robotic manipulation of items using magnetic coupling, according to at least one example. The item manipulation engine 222 (FIG. 2) of the item manipulation system 104 (FIGS. 1 and 2) may perform the process 600 of FIG. 6.

The process 600 may begin at 602 by accessing item information describing a plurality of properties of an item including at least a magnetic manipulation property. In some examples, the magnetic manipulation property may indicate that the item is capable of manipulation using a magnetic patch connected to the item.

In some examples, the magnetic patch may include an iron-infused paint that is applied directly to an exterior surface of the item.

At 604, the process 600 may include determining a manipulation strategy for manipulating the item based at least in part on the item information. In some examples, the manipulation anticipated may be by one or more end effectors of a robotic manipulator.

At 606, the process 600 may include providing the manipulation strategy to the robotic manipulator for manipulating the item via magnetically coupling. In some examples, magnetic coupling may include magnetically coupling an end effector of the one or more end effectors with the magnetic patch connected to the item. In some examples, magnetically coupling the end effector of the one or more end effectors with the magnetic patch may include magnetically coupling an electromagnet of the end effector with the magnetic patch connected to the item.

In some examples, the manipulation strategy identifies a position of the magnetic patch with respect to the item. In some examples, the manipulation strategy further includes manipulating the item by physically grasping the item using a different end effector of the one or more end effectors contemporaneously with the end effector.

In some examples, the magnetic patch includes an asymmetric shape associated with a particular orientation of the item. In this example, determining the manipulation strategy is further based at least in part on the asymmetric shape so as to manipulate the item when the item is in the particular orientation.

In some examples, manipulating the item may include causing an electromagnet of the end effector to couple with the magnetic patch to pick up the item up from a first location. In this example, manipulating the item may also include causing the electromagnet of end effector to decouple from the magnetic patch to place the item at a second location.

In some examples, the magnetic patch may include a magnetic sticker including an adhesive side and a magnetic side. The magnetic sticker may be adhered to the item via the adhesive side and the item being magnetically coupled to the end effector via the magnetic side In some examples, the process 600 may further include determining a size of the magnetic patch based at least in part an item weight value of the plurality of properties of the item and a field strength value of a magnet connected to the end effector. In this example, the process 600 may further include causing connection of the magnetic patch to the item based at least in part on the determined size of the magnetic patch. In some examples, causing connection of the magnetic patch to the item may further include causing application of a quantity of iron-infused paint to the item based at least in part on the determined size of the magnetic patch. In some examples, causing connection of the magnetic patch to the item may further include selecting an adhesive magnetic patch from among a plurality of differently-sized adhesive magnetic patches based at least in part on the determined size of the magnetic patch. In this example, causing connection may further include causing application of the adhesive magnetic patch to the item.

FIG. 7 depicts the process 700 including example acts or techniques relating to robotic manipulation of items using magnetic coupling, according to at least one example. The item manipulation engine 222 (FIG. 2) of the item manipulation system 104 (FIGS. 1 and 2) may perform the process 700 of FIG. 7.

The process 700 may begin at 702 by receiving, from a sensor package, sensor information representing an item.

At 704, the process 700 may include identifying the item based at least in part on the sensor information. The item may include a magnetic patch disposed on an exterior surface of the item. In some examples, the magnetic patch may include a magnetic sticker adhered to the item or an iron-infused paint applied to the item.

At 706, the process 700 may include selecting at least one end effector of a plurality of end effectors for manipulating the item using at least a magnetic patch on the item. In some examples, selecting may be based at least in part on identifying the item.

In some examples, the plurality of end effectors may include a pincher-type end effector, a suction-type end effector. In this example, the at least one end effector may be a magnetic-type end effector.

At 708, the process 700 may include causing the robotic manipulator to manipulate the item by magnetically coupling the at least one end effector with the magnetic patch.

In some examples, magnetically coupling the at least one end effector with the magnetic patch may include magnetically coupling an electromagnet of the at least one end effector with the magnetic patch.

In some examples, the process 700 may further include, after identifying the item, accessing item information associated with the item. The item information may describe one or more properties of the item. In this example, selecting the at least one end effector may be further based at least in part on the item information.

Figure 8:
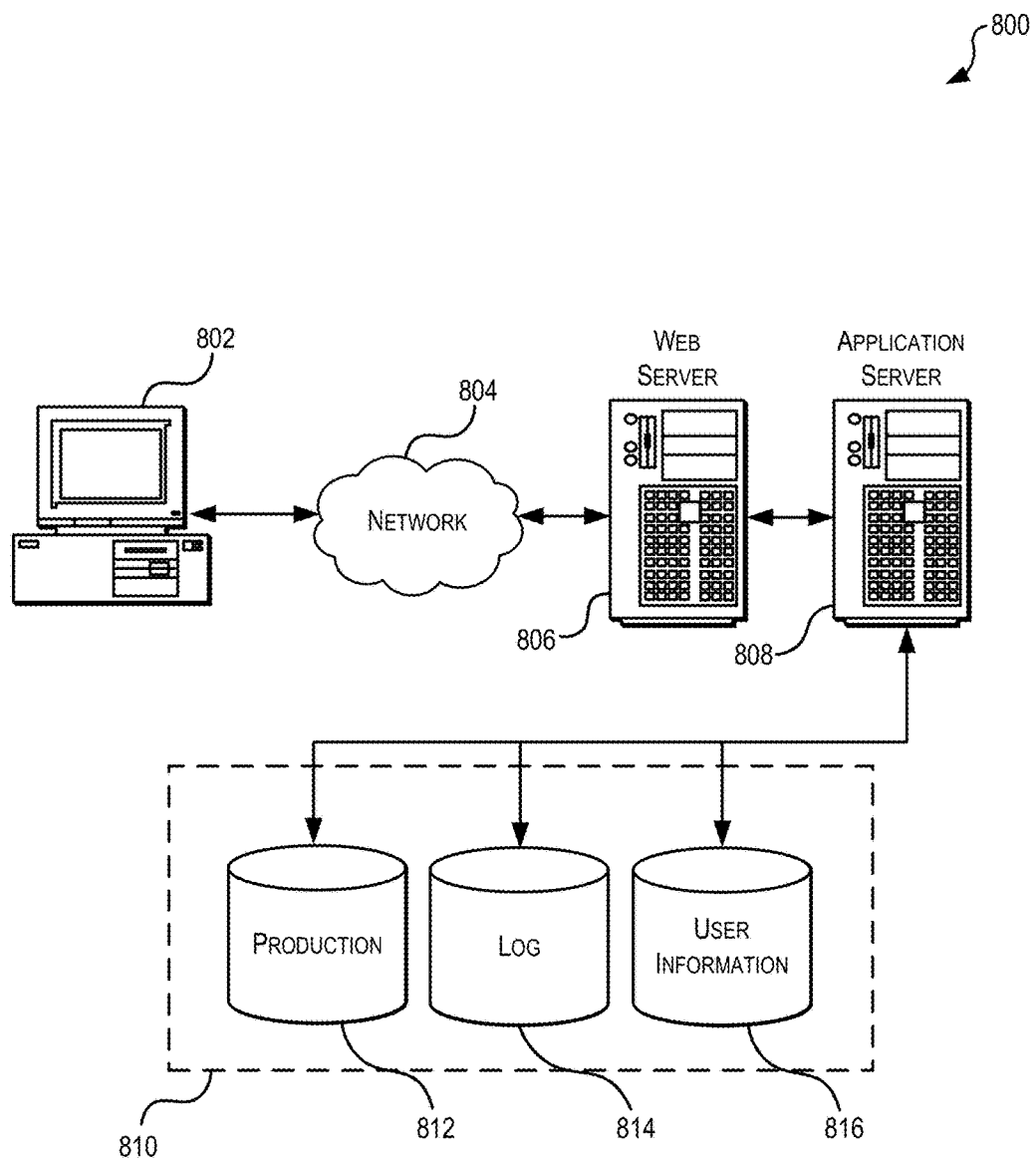
FIG. 8 illustrates an example environment in which various examples can be implemented.

FIG. 8 illustrates aspects of an example environment 800 for implementing aspects in accordance with various examples. As will be appreciated, although a Web-based environment is used for purposes of explanation, different environments may be used, as appropriate, to implement various examples. The environment includes an electronic client device 802, which can include any appropriate device operable to send and receive requests, messages, or information over an appropriate network 804 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well-known and will not be discussed herein in detail. Communication over the network can be enabled by wired or wireless connections and combinations thereof. In this example, the network includes the Internet, as the environment includes a Web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language (HTML), Extensible Markup Language (XML), or another appropriate structured language in this example. The handling of all requests and responses, as well as the delivery of content between the client device 802 and the application server 808, can be handled by the Web server. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing production data 812 and user information 816, which can be used to serve content for the production side. The data store also is shown to include a mechanism for storing log data 814, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the client device 802. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one example is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the environment 800 in FIG. 8 should be taken as being illustrative in nature and not limiting to the scope of the disclosure.

The various examples further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most examples utilize at least one network that would be familiar to those skilled in the art for supporting communications using any of a variety of commercially-available protocols, such as Transmission Control Protocol/Internet Protocol (TCP/IP), Open System Interconnection (OSI), File Transfer Protocol (FTP), Universal Plug and Play (UpnP), Network File System (NFS), Common Internet File System (CIFS), and AppleTalk. The network can be, for example, a local area network, a wide-area network, a virtual private network, the Internet, an intranet, an extranet, a public switched telephone network, an infrared network, a wireless network, and any combination thereof.

In examples utilizing a Web server, the Web server can run any of a variety of server or mid-tier applications, including Hypertext Transfer Protocol (HTTP) servers, FTP servers, Common Gateway Interface (CGI) servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of examples, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate examples may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc Read-Only Memory (CD-ROM), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various examples.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Preferred examples of this disclosure are described herein, including the best mode known to the inventors for carrying out the disclosure. Variations of those preferred examples may become apparent to those of ordinary skill in the art upon reading the foregoing description. The inventors expect skilled artisans to employ such variations as appropriate and the inventors intend for the disclosure to be practiced otherwise than as specifically described herein.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A system, comprising:
    a robotic manipulator comprising one or more end effectors, a first end effector of the one or more end effectors comprising a magnet; and
    a computing device in communication with the robotic manipulator, the computing device configured to:
        access item information describing a plurality of properties of an item;
        determine whether to apply a magnetic patch to the item based at least in part on the item information;
        based at least in part on determining whether to apply the magnetic patch, instruct application of the magnetic patch to the item, the magnetic patch comprising an iron-infused paint;
        update the item information based at least in part on the magnetic patch being applied to the item;
        determine, based at least in part on the updated item information, a manipulation strategy for manipulating the item by the robotic manipulator; and
        instruct the robotic manipulator to manipulate the item using at least the first end effector by magnetically coupling the magnet with the magnetic patch on the item.

2. The system of claim 1, wherein:
    the computing device is further configured to determine a surface area value for the magnetic patch based at least in part on an iron density value of the iron-infused paint, an item weight value of the plurality of properties of the item, and a field strength value of the magnet; and
    instructing application of the magnetic patch comprises instructing application of the magnetic patch such that a surface area of the magnetic patch is about equal to the surface area value.

3. The system of claim 1, wherein instructing the robotic manipulator to manipulate the item using at least the first end effector comprises picking up the item from a known orientation or picking up the item up from a random orientation.

4. The system of claim 1, wherein:
    the magnetic patch comprises at least one of an asymmetric shape or a radio-frequency identification (RFID) tag; and
    the computing device is further configured to, prior to determining the manipulation strategy, identify the item based at least in part on the magnetic patch.

5. A computer-implemented method, comprising:
    accessing item information describing a plurality of properties of an item comprising at least a magnetic manipulation property, the magnetic manipulation property representative of at least one of (i) the item not being naturally magnetic or (ii) the item being capable of manipulation using a magnetic patch connected to the item;
    determining, based at least in part on the item information, a manipulation strategy for manipulating the item by one or more end effectors of a robotic manipulator; and
    providing the manipulation strategy to the robotic manipulator for manipulating the item by magnetically coupling an end effector of the one or more end effectors with the magnetic patch connected to the item.

6. The computer-implemented method of claim 5, wherein magnetically coupling the end effector of the one or more end effectors with the magnetic patch comprises magnetically coupling an electromagnet of the end effector with the magnetic patch connected to the item.

7. The computer-implemented method of claim 5, wherein the magnetic patch comprises:
    iron-infused paint that is applied to an exterior surface of a package that holds the item; or
    a piece of ferrous metal connected to or disposed within the package.

8. The computer-implemented method of claim 5, wherein the magnetic patch comprises a magnetic sticker comprising an adhesive side and a magnetic side, the magnetic sticker being adhered to the item via the adhesive side and the item being magnetically coupled to the end effector via the magnetic side.

9. The computer-implemented method of claim 5, further comprising:
    determining a size of the magnetic patch based at least in part an item weight value of the plurality of properties of the item and a field strength value of a magnet connected to the end effector; and
    causing connection of the magnetic patch to the item based at least in part on the determined size of the magnetic patch.

10. The computer-implemented method of claim 9, wherein causing connection of the magnetic patch to the item further comprises causing application of a quantity of iron-infused paint to the item based at least in part on the determined size of the magnetic patch.

11. The computer-implemented method of claim 9, wherein causing connection of the magnetic patch to the item further comprises:
    selecting an adhesive magnetic patch from among a plurality of differently-sized adhesive magnetic patches based at least in part on the determined size of the magnetic patch; and
    causing application of the adhesive magnetic patch to the item.

12. The computer-implemented method of claim 5, wherein the manipulation strategy identifies a position of the magnetic patch with respect to the item.

13. The computer-implemented method of claim 5, wherein:
    the magnetic patch comprises an asymmetric shape associated with a particular orientation of the item; and
    determining the manipulation strategy is further based at least in part on the asymmetric shape so as to manipulate the item when the item is in the particular orientation.

14. The computer-implemented method of claim 5, wherein manipulating the item further comprises:
    causing an electromagnet of the end effector to couple with the magnetic patch to pick up the item up from a first location; and
    causing the electromagnet of end effector to decouple from the magnetic patch to place the item at a second location.

15. The computer-implemented method of claim 5, wherein the manipulation strategy further comprises manipulating the item by physically grasping the item using a different end effector of the one or more end effectors contemporaneously with the end effector.

16. A system, comprising:
a robotic manipulator comprising a plurality of end effectors;
a sensor package in communication with the robotic manipulator; and
a computing device in communication with the robotic manipulator and the sensor package, the computing device configured to:
receive sensor information representing an item from the sensor package;
identify the item based at least in part on the sensor information, the item comprising a magnetic patch;
select, based at least in part on identifying the item, at least one end effector of the plurality of end effectors for manipulating the item using at least the magnetic patch; and
cause the robotic manipulator to manipulate the item by magnetically coupling the at least one end effector with the magnetic patch.

17. The system of claim 16, wherein the plurality of end effectors comprise a pincher-type end effector, a suction-type end effector, and the at least one end effector, the at least one end effector being a magnetic-type end effector.

18. The system of claim 16, wherein:
the computing device is further configured to, after identifying the item, access item information associated with the item, the item information describing one or more properties of the item; and
selecting the at least one end effector is further based at least in part on the item information.

19. The system of claim 16, wherein the magnetic patch comprises a magnetic sticker adhered to the item or an iron-infused paint applied to the item.

20. The system of claim 16, wherein magnetically coupling the at least one end effector with the magnetic patch comprises magnetically coupling an electromagnet of the at least one end effector with the magnetic patch.

\* \* \* \* \*

UNITED STATES PATENT AND TRADEMARK OFFICE
CERTIFICATE OF CORRECTION

PATENT NO. : 10,471,599 B1  
APPLICATION NO. : 15/695902  
DATED : November 12, 2019  
INVENTOR(S) : David William Guerin Page 1 of 1

It is certified that error appears in the above-identified patent and that said Letters Patent is hereby corrected as shown below:

In the Claims

Column 21, Line 51, Claim 3:  
Delete: "entation or picking up the item up from a random orienta-"  
Insert: --entation or picking up the item from a random orienta- --

Column 22, Line 63, Claim 14:  
Delete: "with the magnetic patch to pick up the item up from a"  
Insert: --with the magnetic patch to pick up the item from a--

Signed and Sealed this  
Second Day of June, 2020

Andrei Iancu  
*Director of the United States Patent and Trademark Office*